United States Patent [19]
Schmidt et al.

[11] Patent Number: 5,396,609
[45] Date of Patent: Mar. 7, 1995

[54] METHOD OF PROTECTING PROGRAMS AND DATA IN A COMPUTER AGAINST UNAUTHORIZED ACCESS AND MODIFICATION BY MONITORING ADDRESS REGIONS

[75] Inventors: Karl-Heinz Schmidt, Aying; Georg Menache; Wilhelm Waidelich, both of München, all of Germany

[73] Assignee: Gesellschaft für Strahlen- und Umweltforschung mbH (GSF), Neuherberg, Germany

[21] Appl. No.: 466,960

[22] Filed: Jan. 18, 1990

[30] Foreign Application Priority Data

Jan. 19, 1989 [DE] Germany ................ 39 01 457.6

[51] Int. Cl.⁶ ................. G06F 12/14; H04L 9/32; G11C 7/00
[52] U.S. Cl. ..................... 395/425; 395/725; 380/4; 364/DIG. 1; 365/195
[58] Field of Search ... 364/200 MS File, 900 MS File; 395/425, 400, 575, 375, 725; 380/4, 3; 365/195

[56] References Cited

U.S. PATENT DOCUMENTS

| | | | |
|---|---|---|---|
| 4,104,721 | 8/1978 | Markstein | 395/375 |
| 4,118,789 | 10/1978 | Casto et al. | 364/184 |
| 4,665,506 | 5/1987 | Cline et al. | 365/195 |
| 4,811,293 | 3/1989 | Knothe et al. | 365/195 |
| 4,951,249 | 8/1990 | McClung et al. | 380/4 |
| 4,954,982 | 9/1990 | Tateishi et al. | 395/425 |
| 4,979,098 | 12/1990 | Baum et al. | 395/400 |
| 5,023,773 | 6/1991 | Baum et al. | 395/425 |
| 5,027,317 | 6/1991 | Pepera et al. | 395/375 |
| 5,043,878 | 8/1991 | Ooi | 395/375 |
| 5,067,077 | 11/1991 | Wakimoto et al. | 395/400 |

FOREIGN PATENT DOCUMENTS

| | | |
|---|---|---|
| 0087956 | 9/1983 | European Pat. Off. . |
| 0152024 | 8/1985 | European Pat. Off. . |
| 0171859 | 2/1986 | European Pat. Off. . |
| 0208192 | 1/1987 | European Pat. Off. . |
| 2376461 | 7/1978 | France . |
| 2533736 | 3/1984 | France . |
| 0230949 | 12/1985 | Germany . |
| 3514430 | 10/1986 | Germany . |
| 1410631 | 10/1975 | United Kingdom . |
| 2127994 | 4/1984 | United Kingdom . |
| 87/07060 | 11/1987 | WIPO . |

OTHER PUBLICATIONS

Carroll, "Implementing Multilevel Security by Violation Privilege," Computers and Security, vol. 7, No. 6, Dec. 1988, pp. 563-573.
Groepler et al, "The Virtual MC68010," Mini-Micro Conference Record, Nov. 8-11, 1983, pp. 1-8.
"Interactive Work Station with Auxiliary Microprocessor for Storage Protection," IBM Technical Disclosure Bulletin, vol. 29, No. 11, Apr. 1987, 1987, pp. 4976-4982.
"Storage Keys Addressed by Logical or Physical Address Bus Under Program Control in IBM System/370," IBM Technical Disclosure Bulletin, vol. 31, No. 6, Nov. 1988, p. 353.
"A Survey of Microprocessor Architectures for Memory Management," by B. Furht et al, Computer, Mar. 1987, pp. 48, 63-67.

*Primary Examiner*—Glenn Gossage
*Attorney, Agent, or Firm*—Spencer, Frank & Schneider

[57] ABSTRACT

A method of protecting programs and data in computers against unauthorized access and modifications employs a programmable hardware circuit to monitor memory regions of a computer. The memory regions are divided into different access levels, and the circuit is programmed to permit access only to predetermined regions. If an unauthorized access is attempted by a program, an address corresponding to the program location initiating the unauthorized access is detected and the program is stopped. This ensures that the procedures for protecting the operating system cannot be circumvented to gain unauthorized access to data of any type. After programming of the circuit is completed, the programming cannot be changed except by actuation of a hardware switch or by re-starting the computer. Removal of the circuit will cause short circuits, thus making it impossible to shut the circuit off without being detected.

9 Claims, 1 Drawing Sheet

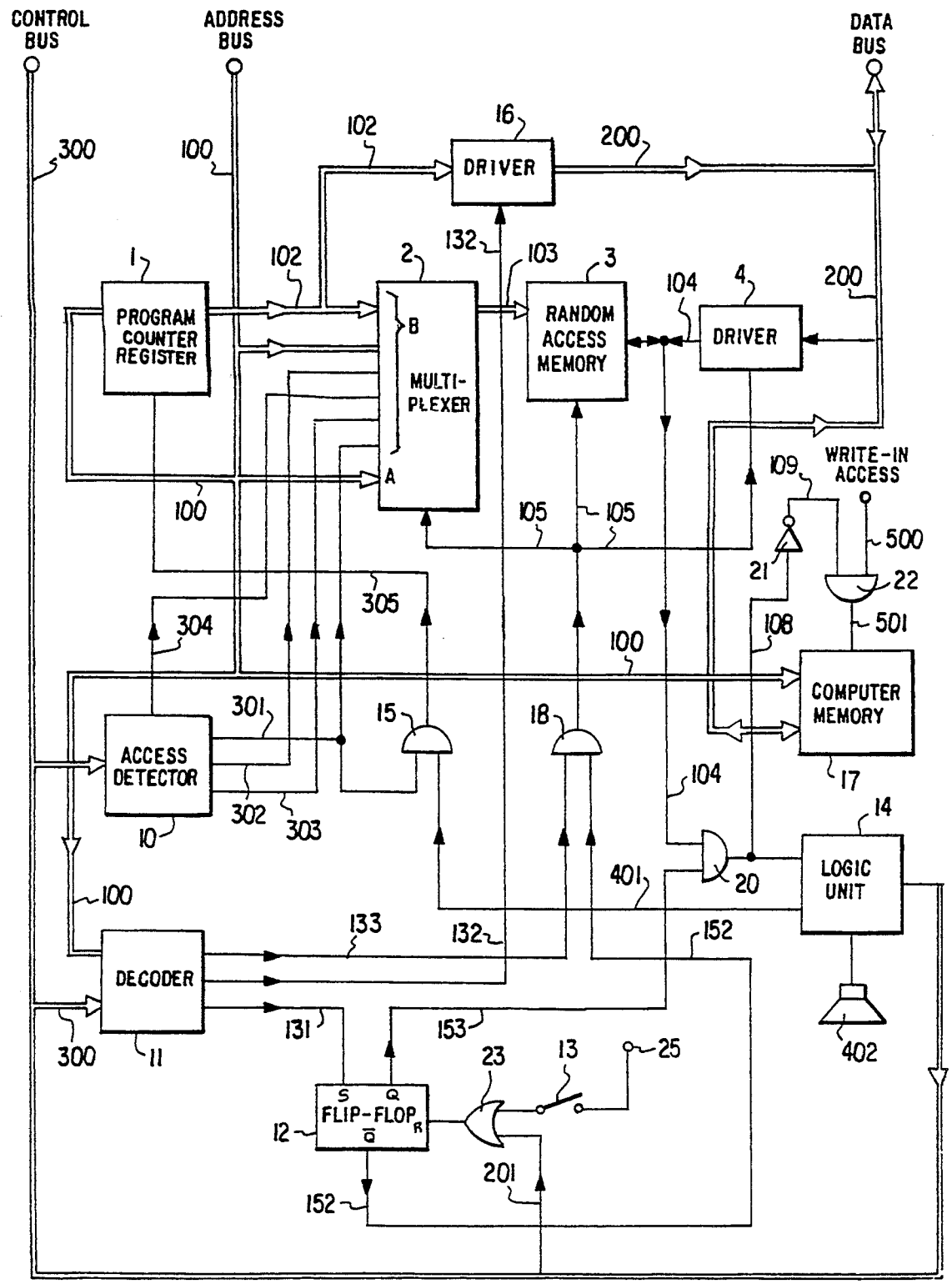

METHOD OF PROTECTING PROGRAMS AND DATA IN A COMPUTER AGAINST UNAUTHORIZED ACCESS AND MODIFICATION BY MONITORING ADDRESS REGIONS

BACKGROUND OF THE INVENTION

The present invention relates to a method for real-time monitoring of address regions in data processing machines, i.e. computers, particularly of such popular types as computers sold under the trademark "IBM" by International Business Machines Corp., Old Orchard Road, Armonk, N.Y. 10504 and compatibles, computers sold under the trademark "Apple" by Apple Computer, Inc., 20525 Mariani Avenue, Cupertino, Calif. 95014, computers sold under the trademark "Commodore" by Commodore Business Machines, Inc., 1200 Wilson Drive, Brandywine Industrial Park, West Chester, Pa. 19380, and computers and microcomputers sold under the trademarks "PDP," "LSI," and "VAX" by Digital Equipment Corp., 6 Tech Drive, Andover, Mass. 01810. The trademarks "PDP," "LSI," and "VAX" are acronyms standing for Programmable Data Processor, Large Scale Integration, and Virtual Address Extension, respectively. More particularly, the present invention relates to a method of real time monitoring of the address regions of memories of data processing devices wherein access to a system bus may be obtained. The method provides for protection of data processing machines and the data stored therein against unauthorized access as well as protection of their operating systems against modifications.

Prior art systems employ hierarchical levels for this purpose so as to prevent lower privilege levels from accessing higher ones. However, with skilled programming and if there are errors in the operating system, blockages between higher and lower levels can be circumvented. The basic problem in a conventional hierarchical structure is that the structure can be changed (and must be capable of change) by means of software; that is, during processing of programs, the processor operates in the various privilege levels which are changed by the software and by jump (go-to) instructions (e.g. by manipulation in the stack region of the computer memory). Although it is possible in principle to monitor important components as to whether any unauthorized modifications have been made, such monitoring takes up computer capacity and, again, can be circumvented by computer programs.

SUMMARY OF THE INVENTION

It is an object of the present invention to improve the above mentioned method in such a way that protection of the programs and data stored in the computer memory is ensured even if manipulations occur in the status of the processor and if attempts are made to manipulate the operating system.

The object is attained according to the invention by a method of real-time monitoring of the memory regions in a data processing device which includes associating selected memory regions of the computer with different access levels, each level having authorized memory operations assigned thereto, storing the associations of memory regions and access levels, and detecting an attempted level of access to a memory region, which is not associated with the memory region.

In the method employed according to the invention, a safety device (hardware) is added to the data processing machine so that an additional safeguard is realized for the system software. One feature of this safety device is that it contains a monitoring circuit which can be programmed only once. Once the programming of the monitoring circuit has been completed, further access to it is no longer possible without a direct mechanical adjustment of the device. The safety device can thus not be made inoperative by external programs.

The safety device is composed of a hardware module (typically in the form of a card) which is inserted into the respective computer or is incorporated in the computer during manufacture. Once the safety device is in place, monitoring of the computer to assure its continued presence, although possible, is not necessary during operation of the computer since extraction of the module produces short circuits which prevent the computer from operating properly.

Advisably, the module is a circuit built up on a printed circuit board which is inserted into the respective computer. To prevent starting of the computer with the card pulled out, a routine may be provided in the operating system which determines whether the card has been inserted.

The present circuit has the advantage that considerable improvements in the protection against unauthorized access to the computer and its data can be realized with only slight changes to the operating system.

At the start of the computer's operating system, i.e. when the computer is first turned on, the module is programmed in such a way that access to certain memory or port addresses is permitted only under certain conditions corresponding to seven levels to be described below, the levels being associated with particular regions of the computer memory:

Level 0:

Reading out of and writing into the memory cells or memory locations of a first region of the computer's memory is not possible; programs can be started only from certain program locations of the first region.

Level 1:

Reading out of and writing into the memory cells in a second region of the computer's memory is not permitted; programs can be run from all program locations of this region.

Level 2:

Reading out of memory cells of a third region of the computer's memory is permitted from certain portions of this region; but no running of programs in this region is permitted.

Level 3:

Reading out of and writing into memory cells of a fourth region of the computer's memory is permitted from certain portions of this region; but running of programs from this region is not permitted.

Level 4:

Reading out of memory cells of a fifth region of the computer's memory is permitted from certain portions of this region; running of programs from this region is permitted.

Level 5:

Reading out of and writing into memory cells of a sixth region of the computer's memory is permitted from certain portions of this region; running of programs from this region is permitted.

Level 6:

Reading out of and writing into all cells in a seventh region of the computer memory is always permitted.

A memory could, for example, be subdivided according to the above-listed levels so that the operating system is assigned to level 0; the system data, important jump instructions and peripheral addresses are assigned to levels 2 and 3; the jumps into the system routine are assigned to level 1; and user programs are assigned to level 6. A region is comprised of single memory cells or memory locations that can be chosen independently (i.e., randomly).

Upon the occurrence of an unauthorized access to a memory cell of the computer's memory, the following possibilities for a response exist:

(1) The computer is always stopped and an alarm is sounded.

(2) The computer is stopped only for unauthorized write-in operations; for unauthorized read-out operations, the actuating program is identified and interrupted.

(3) If the hardware module is connected with the computer in such a way that unauthorized write-in instructions cannot be performed, then it is not necessary to stop the computer in this case and the above procedure in which the actuating program is identified and interrupted can be employed.

A simplification of the system can be realized if no differentiation is made between access to the computer's memory for running programs on the one hand, and reading from and writing into memory cells on the other. Then levels 2 and 3 remain.

The computer systems to be protected can be roughly divided into two classes:

(1) single-user systems, e.g. PC's (personal computers); and (2) multi-user systems, e.g. VAX, networked PC's.

For single-user systems, such as the PC, the so-called viruses constitute a danger for stored data. Here protection can be realized in that for data base access only the program sequences predetermined by the operating system are permitted and direct access to BIOS (Basic Input/Output System) is blocked by the method of the invention. Additionally, this method can be employed to monitor attempts to change the operating system.

For multi-user systems, such as the VAX or networked PC's, data bases are usually provided with access protection. However, this access protection can be circumvented in many ways, for example input-output routines may be redirected to circumvent the protection provided by passwords. In this case, it is particularly important for the jump instructions not to be changed by the processor in a supervisor state. This can be ensured by the present invention.

BRIEF DESCRIPTION OF THE DRAWING

These and other aspects of the invention may be more completely understood from the following detailed description of the preferred embodiment with reference to the single appended FIGURE, which illustrates a block diagram of a circuit for monitoring memory regions.

DESCRIPTION OF THE PREFERRED EMBODIMENT

Processors, e.g. PC's, available on the market are equipped with outputs which indicate, in addition to the memory address, the respective type of access. Referring to the FIGURE, these outputs, respectively provided on address bus 100 and control bus 300, are employed to make available: a momentary program counter address (stored in a program counter register 1) on lines 102, the type of access on lines 301 to 304, and the momentary memory address (port or cell address in the computer memory 17) on address bus 100. These data are compared by means of a suitable circuit such as a random access memory (RAM) 3 with the permissible accesses stored, for example, as a look-up table, in the memory 3, and are examined for authorization. Memory 3 and its look-up table are configured in such a way that write-in access to the table can be blocked by a flip-flop 12, which receives a control signal from bus 300 in response to a software instruction, and an AND-gate 18. Advisably, after programming of the look-up table in the memory 3, renewed access thereto is possible only by way of a hardware switch 13. When switch 13 is actuated, it connects one input of OR gate 23 to a terminal 25 that is kept at a positive supply potential.

A logic unit 14, for example a programmable array logic (PAL), is provided to emit various signals in response to detection of an unauthorized access to the computer memory 17. If a memory cell or location (identified by the address on address bus 100) of the computer memory 17 of the computer to be protected, is accessed without authorization, logic unit 14 is activated via line 104 through AND-gate 20, and any possible write-in access on line 500 to a memory cell of the computer memory 17 identified on address bus 100, is blocked by the output of AND-gate 20 at AND-gate 22 via an inverter 21. Additionally, further writing into program counter register 1 is blocked by a signal from logic unit 14 at an AND-gate 15. The logic unit 14 also emits a signal on an interrupt line which is part of bus 300. In response to the interrupt, the operating system reads the program counter state (last program address) on line 102 via driver 16, and stops the program which initiated the unauthorized access.

The association of the access levels with the regions of the computer memory 17 effected by memory 3 is, at the start-up of the computer, initiated by connecting the memory 3 via a multiplexer 2 to the address bus 100, and via a driver 4 to a data bus 200. Such connections are made in response to an actuation signal on line 105 created by AND-gate 18. Multiplexer 2 responds to the actuation signal by selecting the signals supplied to its input port A, that is, the current address signals on bus 100.

Then, due to the actuation signal on line 105, the data can be written into memory 3 by way of data bus 200, via driver 4 (which is actuated by the signal on line 105) and line 104. Line 105 is connected by way of AND gate 18 and a decoder 11 to address bus 100 and control bus 300, from where the actuation signal originates. The selector 11 may be part of a PAL (programmable array logic). The decoder 11 activates one of the lines 131/132/133 when recognizing respective signals from the buses 100 and 300.

When the computer is started, flip-flop 12 is reset ($\overline{Q}=1$) by a signal on control bus 300 via a reset line 201 and the OR gate 23, thereby to control AND-gate 18 via line 152. Thus, write-in access to memory 3 is activated on line 105 via AND-gate 18. Write-in access to memory 3 is then possible as a result of an access actuation signal from control bus 300 through decoder 11 directed to memory 3 via line 133 and AND-gate 18. Logic unit 14 is blocked by way of AND-gate 20. At the end of programming (writing in) of the memory 3, further write-in access is blocked by activation of a line 131 with a signal from control bus 300 through decoder 11 to set flip-flop 12, causing AND-gate 18 to be blocked via line 152, and AND-gate 20 is enabled via line 153. Thus, unauthorized access can now be detected.

During operation of the computer, the addresses in the memory 17 of: (1) programs which are run, (2) memory cells being accessed for a read operation or a write operation, (3) memory cells being (or to be) written into, and (4) memory cells containing data being read, are detected with the aid of an access detector 10 (which may be a PAL). The access detector activates the following lines for the respective accesses:

line 301 is activated if control data on bus 300 indicates that the content of a memory cell or location in memory 17 is being loaded into the CPU as an operation code, whereupon the relevant address is fed into the program counter register 1;

line 302 is activated if control data on bus 300 indicates that access is being made to a memory cell in memory 17;

line 303 is activated if control data on bus 300 indicates that data is being read out of a memory cell (port address) in memory 17; and line 304 is activated if control data on bus 300 indicates data are being written into a memory cell or location in memory 17.

These lines, together with address bus 100 and program address lines 102, are connected via input port B of multiplexer 2 to the input lines 103 of memory 3 if line 105 is not activated. The address bus 100 is connected with the address bus of the CPU.

One of the two inputs from address bus 100 to the multiplexer 2 is supplied to input port A of multiplexer 2 and used for programming the memory 3, if line 105 is activated. When programming of memory 3 is completed and line 105 is not activated, multiplexer 2 selects the other input from bus 100, which is supplied to input port B of multiplexer 2 along with the signals on status lines 301–304 and the last program counter address from register 1 on lines 102.

It is advantageous to divide the memory region into certain zones. For example, memory 17 can be divided into two zones on the basis of the most significant address bit, into four zones on the basis of the first two most significant address bits, and so forth. One then forms program blocks to which the respective access levels are assigned. Omitting the lower order address bits (that is, address bits that are less significant than those needed to attain the desired zones in memory 17) avoids unnecessary subdivisions. Omitting the lower order address bits also reduces the memory requirements for memory 3, so input port B of multiplexer 2 need not pass them from address bus 100 to lines 103.

If line 301 was activated and gets deactivated, then the last program counter address is stored in register 1 due to a signal from line 301 via AND-gate 15 and line 305. The last program counter address stored in register 1 is transmitted by lines 102 via multiplexer 2 together with the momentary address on address bus 100 and access data on status lines 301, 302, 303 and 304 to the address input of memory 3. As a result, the access address, the type of access and the program address from which access occurs, are provided to the memory 3, where they are compared to the authorized access data stored therein.

The output on line 104 from memory 3 is conducted via AND-gate 20 to the logic unit 14 which either performs an interrupt on the program being run via control lines 300 or stops the computer via lines 300, and emits an alarm signal via loudspeaker 402. Additionally, further writing into register 1 is prevented in that AND-gate 15 is blocked by a signal from logic unit 14 via line 401.

During unauthorized access, the program counter address in register 1 can then be read out via lines 102 and driver 16 onto data bus 200, in response to a signal on bus 300 which activates the driver 16 via selector 11 and line 132. Thus the program performing the unauthorized access can be identified. For unauthorized write-in accesses, computer memory 17 is blocked by the output of AND-gate 20 via line 108, inverter 21, line 109 and AND-gate 22.

Another simplification of the structure is possible if register 1, which stores the last program address (last program counter state), and parts of the associated logic unit (access detector 10) are omitted. Memory 3 need then only have half the memory region. However, since the unauthorized access is no longer localized, the system is then suitable only for smaller systems since the computer should be stopped if there is an unauthorized access.

It will be understood that the above description of the present invention is susceptible to various modifications, changes and adaptations, and the same are intended to be comprehended within the meaning and range of equivalents of the appended claims.

What is claimed is:

1. A method of real-time monitoring of memory regions in a data processing device having a plurality of bus lines and having a memory with a plurality of memory locations, with each memory region including a plurality of memory locations, said method comprising the steps of:

associating selected memory regions of the memory with different access levels, an access level associated with a memory region indicating whether read operations from that memory region are authorized, whether write operations to that memory region are authorized, and whether program running operations from that memory region are authorized;

storing the associations of memory regions and access levels;

comparing a level of an attempted access and a memory region to which the attempted access is directed with the stored associations, the comparing step comprising the step of checking signals on at least some of the bus lines; and detecting if the level of the attempted access and the memory region are not among the stored associations, thereby to detect an unauthorized attempted access; and, wherein said step of associating includes the steps of:

associating a first region of the memory with a zeroth level of access defined by prohibiting reading out of and writing into predetermined memory locations of the first region and permitting programs to be started only from certain memory locations in the first region;

associating a second region of the memory with a first level of access defined by prohibiting reading out of and writing into predetermined memory locations of the second region and permitting programs to be run from all memory locations in the second region;

associating a third region of the memory with a second level of access defined by permitting reading out of memory locations of only certain portions of the third region and prohibiting programs from being run from all memory locations in the third region;

associating a fourth region of the memory with a third level of access defined by permitting reading out of and reading into memory locations of only certain portions of the fourth region and prohibiting programs from being run from all memory locations in the fourth region;

associating a fifth region of the memory with a fourth level of access defined by permitting reading out of memory locations of only certain portions of the fifth region and permitting programs to be run from all memory locations in the fifth region;

associating a sixth region of the memory with a fifth level of access defined by permitting reading out of and reading into memory locations of only certain portions of the sixth region and permitting programs to be run from all memory locations in the sixth region; and associating a seventh region of the memory with a sixth level of access defined by permitting reading out of and reading into all memory locations of the seventh region.

2. A method as in claim 1, wherein said step of detecting includes the step of detecting a program from which the unauthorized attempted access is made.

3. A method as in claim 1, wherein said step of detecting includes the step of detecting an attempted access which includes unauthorized instructions to write into the memory regions of the data processing device, the method further comprising the step of blocking the writing.

4. A method as in claim 1, further comprising the steps of stopping the data processing device and sounding an alarm in response to a detection of any attempted unauthorized access to a memory location.

5. A method as in claim 1, further comprising the steps of:
 interrupting the data processing device in response to a detection of an attempted unauthorized access for writing into a memory location, and
 identifying and interrupting a program in response to a detection of an attempted unauthorized access for writing into a memory location.

6. A method as defined in claim 1, wherein said step of storing comprises the step of storing the associations of memory regions and access levels as a look-up table in a random access memory.

7. A method as defined in claim 1, further comprising the step of identifying a program initiating an unauthorized attempted access, said step of identifying including the step of storing a last program counter address of the program in a register.

8. A method as in claim 1, wherein said step of storing comprises the step of storing the associations of memory regions and access levels in an additional memory, and wherein the method further comprises the step of blocking writing into the additional memory after the associations have been stored in the additional memory.

9. A method as in claim 8, further comprising the step of unblocking writing into the additional memory, the step of unblocking writing including actuating a switch.

* * * * *